M. A. DEES.
VOTING MECHANISM.
APPLICATION FILED MAR. 12, 1909.

948,757.

Patented Feb. 8, 1910.

Witnesses
Milton Lenoir
Lois Force

Inventor
Mark A. Dees
By Albert H. Graves
Attorney.

M. A. DEES.
VOTING MECHANISM.
APPLICATION FILED MAR. 12, 1909.

948,757.

Patented Feb. 8, 1910.
8 SHEETS—SHEET 3.

Witnesses
Inventor
Attorney.

M. A. DEES.
VOTING MECHANISM.
APPLICATION FILED MAR. 12, 1909.

948,757.

Patented Feb. 8, 1910.
8 SHEETS—SHEET 6.

Witnesses
Milton Lenoir
Lois Force

Inventor
Mark A. Dees
Albert P. Graves
Attorney

M. A. DEES.
VOTING MECHANISM.
APPLICATION FILED MAR. 12, 1909.

948,757.

Patented Feb. 8, 1910.

M. A. DEES.
VOTING MECHANISM.
APPLICATION FILED MAR. 12, 1909.

948,757.

Patented Feb. 8, 1910.

YEAS AND NAYS.

UNITED STATES PATENT OFFICE.

MARK ASHLEY DEES, OF PASCAGOULA, MISSISSIPPI.

VOTING MECHANISM.

948,757.   Specification of Letters Patent.   Patented Feb. 8, 1910.

Application filed March 12, 1909. Serial No. 482,908.

*To all whom it may concern:*

Be it known that I, MARK ASHLEY DEES, a citizen of the United States, residing at Pascagoula, county of Jackson, and State of Mississippi, have invented certain new and useful Improvements in Voting Mechanisms, of which the following is a specification.

This invention relates to improvements in voting mechanisms and refers more particularly to a construction adapted for use in registering, counting and recording the votes in legislative bodies.

Among the salient objects of the invention are to provide a vote recording mechanism in which the members of the legislative body initially place the registering devices in position to record the votes as desired, and in which the final operation of registering, counting and recording the votes is automatically completed by the clerk or chairman independently of the control of the members themselves; to provide a construction which, with the exception of the said initial operations, is positively and mechanically actuated thus obviating the delicate electrically controlled mechanisms found in devices of the prior art; to provide a construction in which simultaneously with the recording of the votes, any desired identifying date may be printed or stamped upon the tally or recording sheet; to provide a construction in which the act of registering the votes automatically places the machine in position to accurately count the same; to provide novel means for automatically counting not only the yea and nay votes but also the number of members not voting and the total of votes counted; to provide various safety devices for insuring the accurate register, recording and counting of the votes and the restoring of the various parts to normal position; to provide a construction in which substantially all of the operating mechanism may be placed behind the speaker's desk or out of the way, and which obviates the necessity of placing any complicated or delicate mechanism at the desks of the individual members; to provide a construction in which the operation of registering, counting and recording the votes are each respectively performed by a single operation; to provide in a device of the character referred to simple circuit connections controlling the said initial operations; said circuit connections being so arranged that the chairman or clerk may cut out the circuit connections of any individual member not present and may likewise cut all the members out of circuit during the time the clerk is registering the votes; to provide a mechanism which is simple and reliable in operation, compact in construction and devoid of delicate mechanism; and in general to provide an improved construction of the character referred to.

In the accompanying drawings

Figure 16:
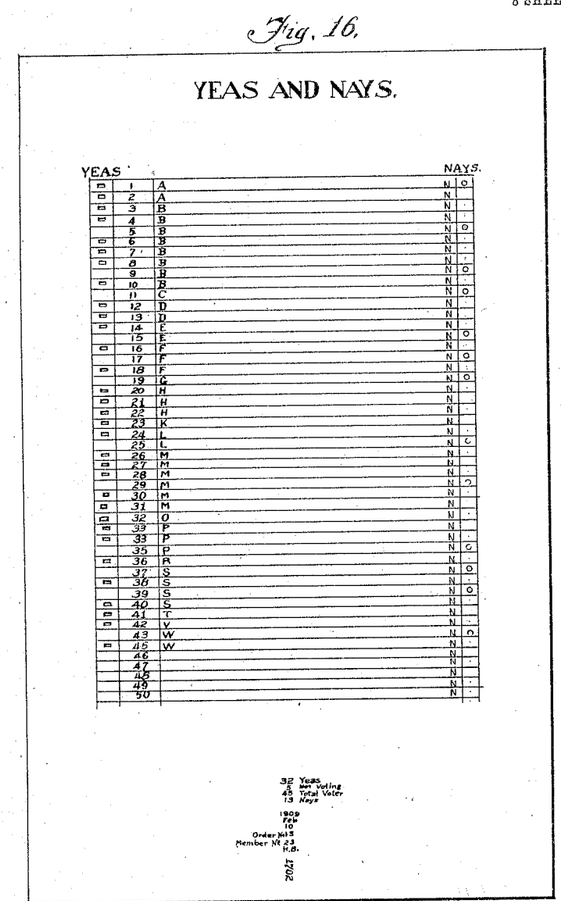
Fig. 16 is a sample sheet showing the manner in which the sheet is marked to make the complete record of the votes cast.

Referring first to the sheet of Fig. 16, said sheet is ruled horizontally and the central portion of it contains the names of the different legislators entitled to vote upon any measure that may be up for consideration. The different legislators are numbered, the numbers being in regular order from the first to the last, so that the highest number opposite a name on the sheet represents the total number of voters. At the extreme left of the sheet is a column headed by the word "yeas", under which are a series of rectangular punch marks opposite a greater or less number of the names of the legislators, these punch marks represent the yea votes of the legislators opposite whose names they stand. At the extreme right of the sheet is another column headed by the word "nays" in which are a series of circular punch marks opposite the names of other legislators, which circular punch marks represent the nay votes cast by the legislators opposite whose names these marks stand. In the lower part of the sheet is a number opposite the word "yeas" which represents the number of rectangular punch marks in the left hand column. Next below this is another number opposite the words "not voting"; next below that is another number representing the total voters, which is a number corresponding to the total number of legislators voting. Next below this is a number opposite the word "nays", which number represents the number of circular punch marks in the left hand column. Below these items are other numbers representing dates and marks of various kinds, designating the nature of the matter voted upon by the legislators. The device to be described hereinafter is a device to punch the sheets as described, and to mark upon the lower portion of it the numbers which will show how many punch marks there are of each kind, the total number of punch marks and the number of persons not voting, also the other matter below that.

The device is in the form of a table 1 standing upon legs 2, in the upper part of which table is a door 3 supported on hinges 4 and secured in place by buttons 5. On the front part of this door is a hand-stamp 6 of an ordinary kind fastened by a bracket 7 to the upper part of the door, so that when the door is raised and turned backward the hand-stamp will move with it. Directly below this hand-stamp are a series of wheels which are moved in a manner which will be hereinafter described to set up the numbers which appear in the lower part of Fig. 16.

Figure 3:
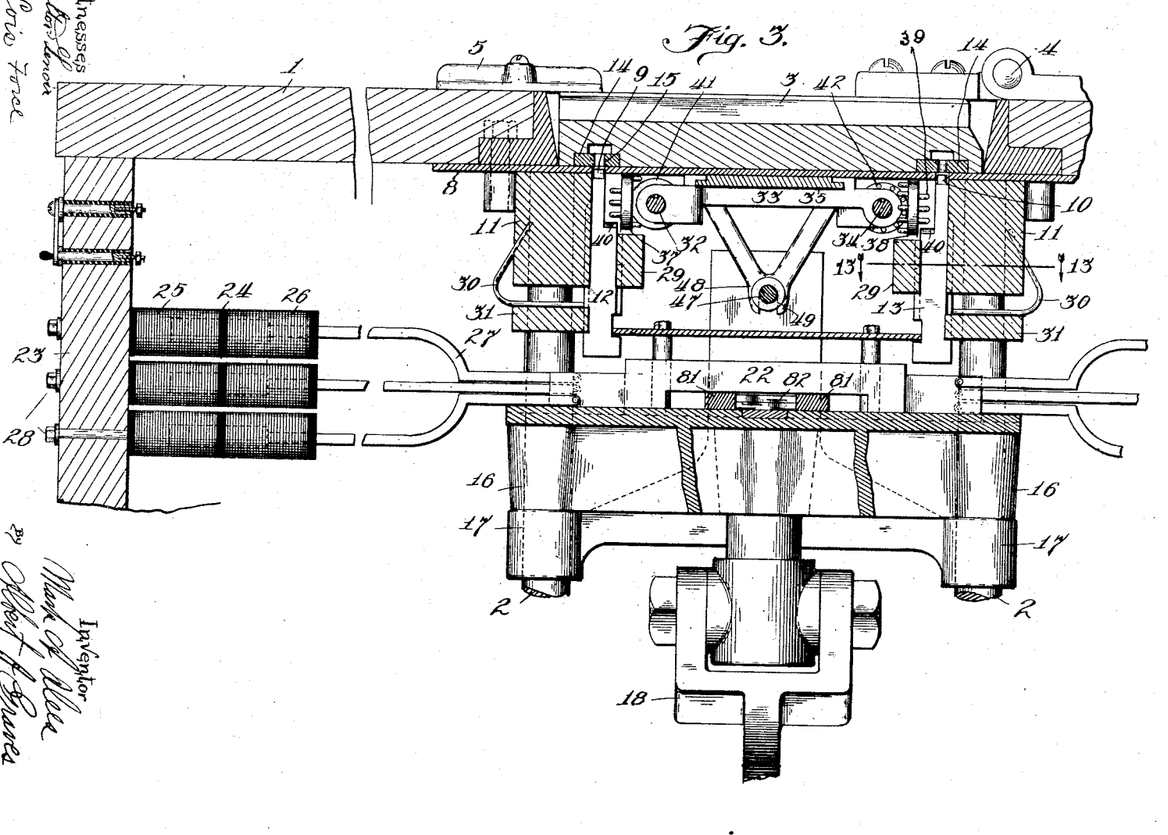
Fig. 3 is a transverse section on line 3—3 of Fig. 2.

When the door 3 is raised it exposes a metal plate 8, in which are two rows of die holes for punches. The holes at the left are rectangular holes 9 of the size and shape of those in the left hand column of Fig. 16. The holes at the right are circular holes 10 of the size and shape corresponding to the circular holes shown at the right hand of Fig. 16. The plate 8 is supported on two bars or beams 11 which run lengthwise of the table just beneath its top and preferably in line with the legs 2, as shown in Fig. 3. Arranged in a solid row by the side of these bars 11 are punches 12 having rectangular ends at the top to fit the die holes 9, and similar punches 13 having circular ends at the top to fit the circular holes 10. These punches are normally held in a position so that they project slightly into the corresponding holes in the plate 8 just beneath the place where the paper, shown in Fig. 16. is inserted. Secured to the cover 3 are corresponding dies 14 into which these punches operate when moved upward to punch holes in the paper while between the cover and the plate 8. A longitudinal chamber 15 over the place 14 runs clear through the cover 13, so that punchings may have a place to escape.

Figure 1:
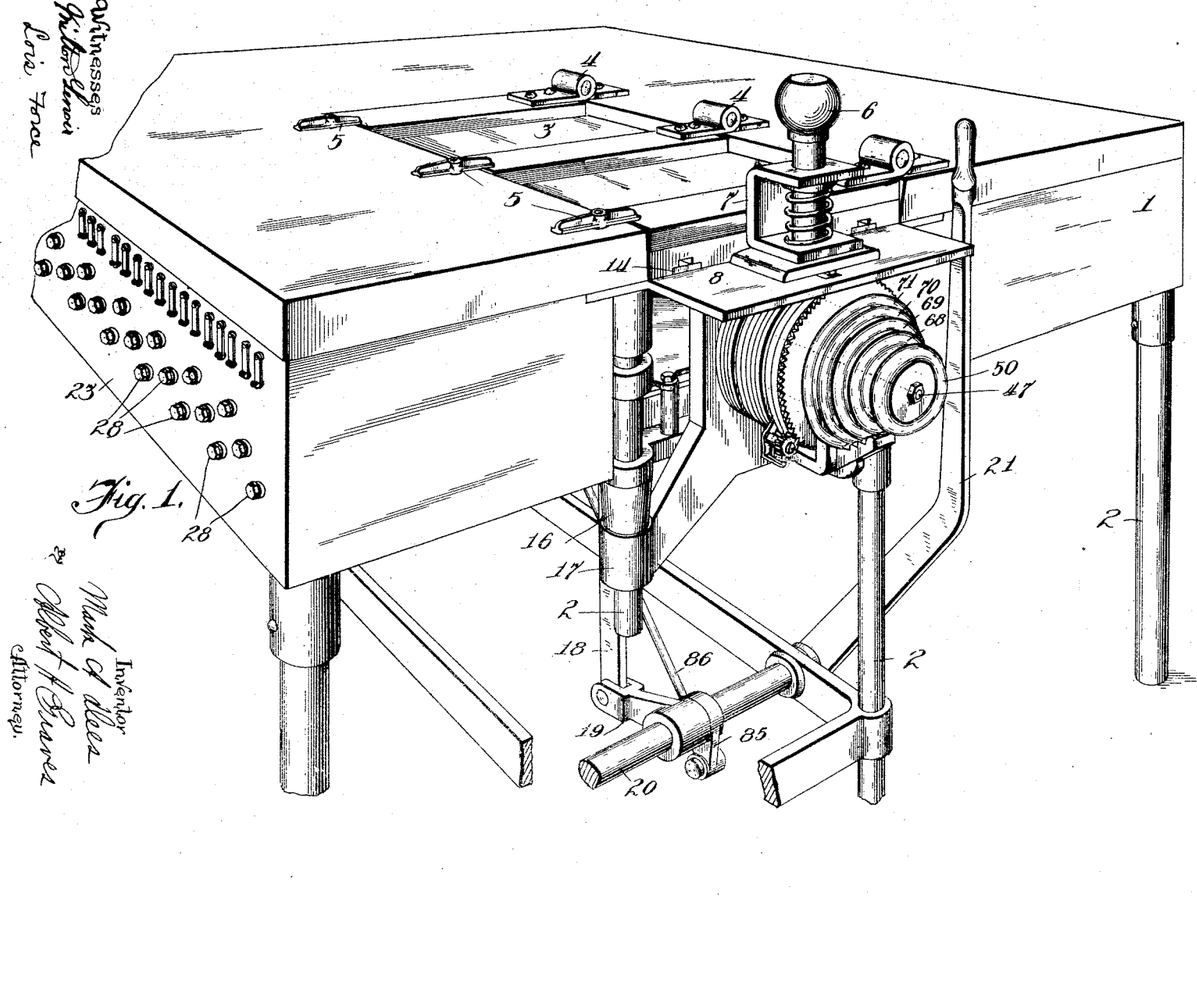
—Figure 1 is a perspective view, partly broken away, of the device in its normal position viewed principally from the front.

Arranged to slide on the legs 2 is a platen 16, which is normally held at a fixed position by resting on cover 17 secured to the legs 2. To the lower part of the platen 16 is pivoted a link 18 (see Figs. 1 and 3) which connects to an arm 19 on a shaft 20 in the lower part of the device. Also connected to the shaft 20 is a lever 21 by which the operator may raise the platen 16.

Resting on the platen 16 are a series of movable bars or members 22, the upper edges of which are slightly below the lower ends of the punches 12 and 13. They also lie between the punches 12 and 13, so that if the platen be raised while these bars or movable members are in the mid-position they will pass by and not touch the ends of the punches 12 and 13. If, however, one of these movable members 22 should be moved to the left (see Fig. 3) before the platen 16 is raised the top part of the member 22 would engage the lower end of punch 12 and raise it. In the same way, if the member 22 should be moved to the right before the platen 16 was raised, then the raising of that platen would raise the punch 13. The punches 12 and 13 are arranged in two rows opposite each other, so that the first punch in one row and the first punch in the other row corresponding to it form a pair. The second punches in the two rows would form a second pair, and so on. The members 22 are arranged correspondingly to these pairs, so that the first member 22 is adjacent to the first pair of punches and the second member 22 is adjacent to the second pair of punches, and so on. By moving the first member to the right or left, one or the other punches will be selected. For convenience of reference I will call punches 12, which make the rectangular holes in the record sheet of Fig. 16, the yea punches, and the punches 13, which make the circular holes of the record sheet, the nay punches. One yea punch and one nay punch together with one of the movable members 22 is allocated to each voter.

On the left-hand wall 23 of the table 1 are secured a series of solenoids 24, each of which has two windings 25 and 26. The armature for these solenoids normally stands in the mid-position, and is shown by dotted lines in Fig. 3. If a current is sent through the winding 25 the armature of the solenoid is drawn from its mid-position to the left into the central part of that winding. On the other hand, if a current should be sent through the winding 26 the armature would be moved in the opposite direction toward the center of the winding 26. A solenoid of this kind is connected through links 27 with each one of the movable members 22 and electrical connections are provided from the solenoid to the legislator's desk, so that by pressing an appropriate key he will send an impulse through either winding of the solenoid allocated for his use and by that means move his member 22 either to the right or the left to select whichever kind of vote he desires to cast on the measure before the house at the time. These solenoids are fastened to the plate 23 by bolts 28 in tiers three high, so that they may be brought within the narrow space occupied by the row of punches 12 or 13.

Figures 12, 13, 14:
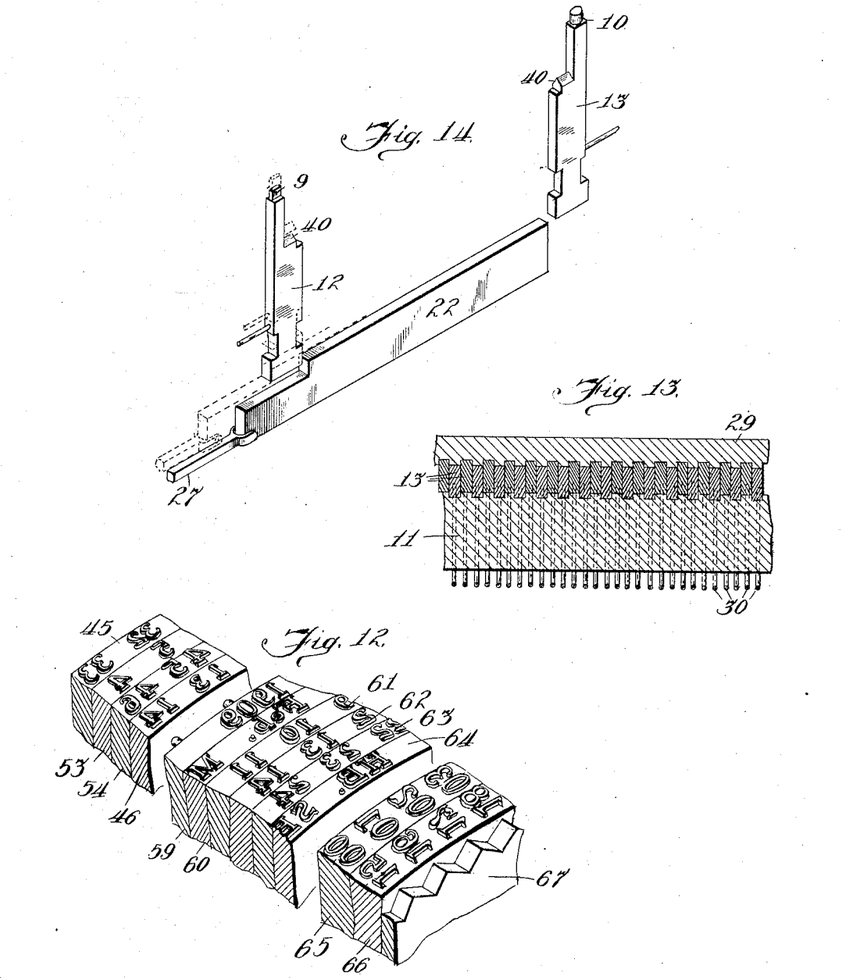
Fig. 12 is an enlarged perspective of parts of the faces of the printing wheels used in the device.
Fig. 13 is a section on line 13—13 of Fig. 3.
Fig. 14 is a perspective of a pair of the punches and connected parts used in marking the record sheet for recording the votes cast by the legislators voting.

For convenience in guiding the punches, they are set into the bar 11 and another guide-bar 29, in the manner shown in Fig. 13. This is simply a matter of detail in construction for the guiding of these punches to prevent their displacement. Secured to each punch is a spring 30 which normally rests against a bridge 31 and holds the punches in the lower position, or returns them to a lower position in case they should not come down in the ordinary operation. The spring also serves to hold down any punch from improper movement as a result of friction between it and two adjacent punches in case it is not intended to be moved at the time these two punches are moved.

Extending longitudinally through the machine are two rods 32 and 34 on which slide a frame 33. The frame 33 is guided and held by guides 35 secured on the bottom of plate 8. Running transversely on the frame 33 is a shaft 36 on which are wheels 37 and 38. On the outside of these wheels are pins 39 which are adapted to engage a projecting edge or part 40 of the punches 12 and 13 when said punches are raised from the normal position and when the wheels 37 and 38 move over them. Secured to the shafts 32 and 34 by feathers are wheels 41 and 42 which mesh with pins on the inner faces of the wheels 37 and 38. On the front ends of shafts 32 and 34 are other wheels 43 and 44 which engage pins on wheels 45 and 46 mounted on an axis which corresponds with that of the central shaft 47. The lower part of the frame 33 ends in a fork 48 which engages a collar 49 secured to the shaft 47. The front end of this shaft ends in a handle 50, while the rear end terminates in a piston 51 located in the cylinder 52, which cylinder contains a liquid. The object of this piston, cylinder and liquid is to prevent the too rapid movement of the shaft 47 when pulled forward by hand.

Figures 5, 6, 7, 8:
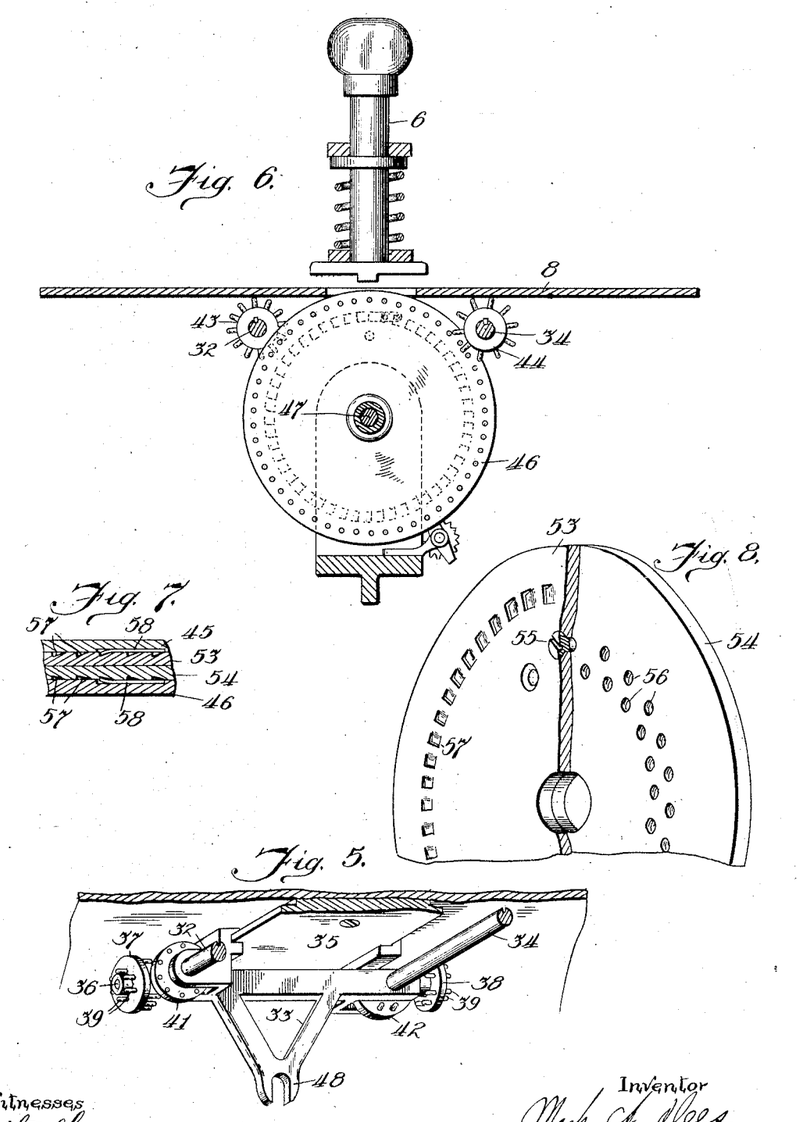
Fig. 5 is a perspective of some of the details used in counting votes.
Fig. 6 is a detached section on line 6—6 of Fig..2.
Fig. 7 is a sectional detail of a part of the wheels shown in Fig. 8.
Fig. 8 is a perspective of a portion of the wheels shown in Figs. 6 and 7.
Figure 9:
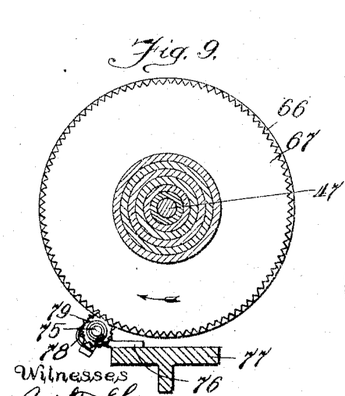
Fig. 9 is a section on line 9—9 of Fig. 4.
Figure 10:
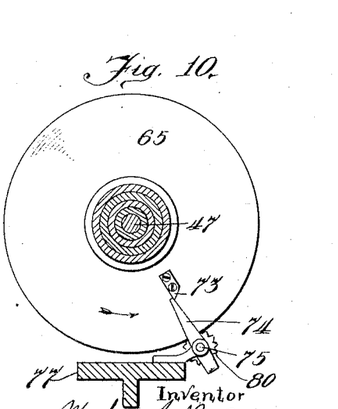
Fig. 10 is a section on line 10—10 of Fig. 4.
Figure 11:
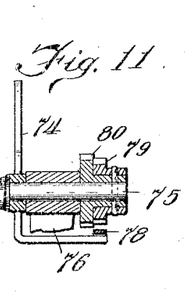
Fig. 11 is a section on line 11—11 of Fig. 10.

Located on the common center with the wheels 45 and 46 and between the same are two other wheels 53 and 54, which are secured together by screws 55 which enter holes 56. These wheels are numbered on their outer faces, and the screws 55 and holes 56 are so arranged that the wheels may be adjusted with respect to each other, so that any number of one wheel may be set opposite any number on the other wheel and the two wheels secured together in this position. The arrangement of these holes is shown in Fig. 8.

The wheels 53 and 54 are provided with notches 57, which are in effect ratchet teeth. Let into each of the wheels 45 and 46 are pawls 58 which are adapted to engage the teeth 57 so as to move the wheels 53 and 54 when either wheel 45 or 46 is moved.

Figure 2:
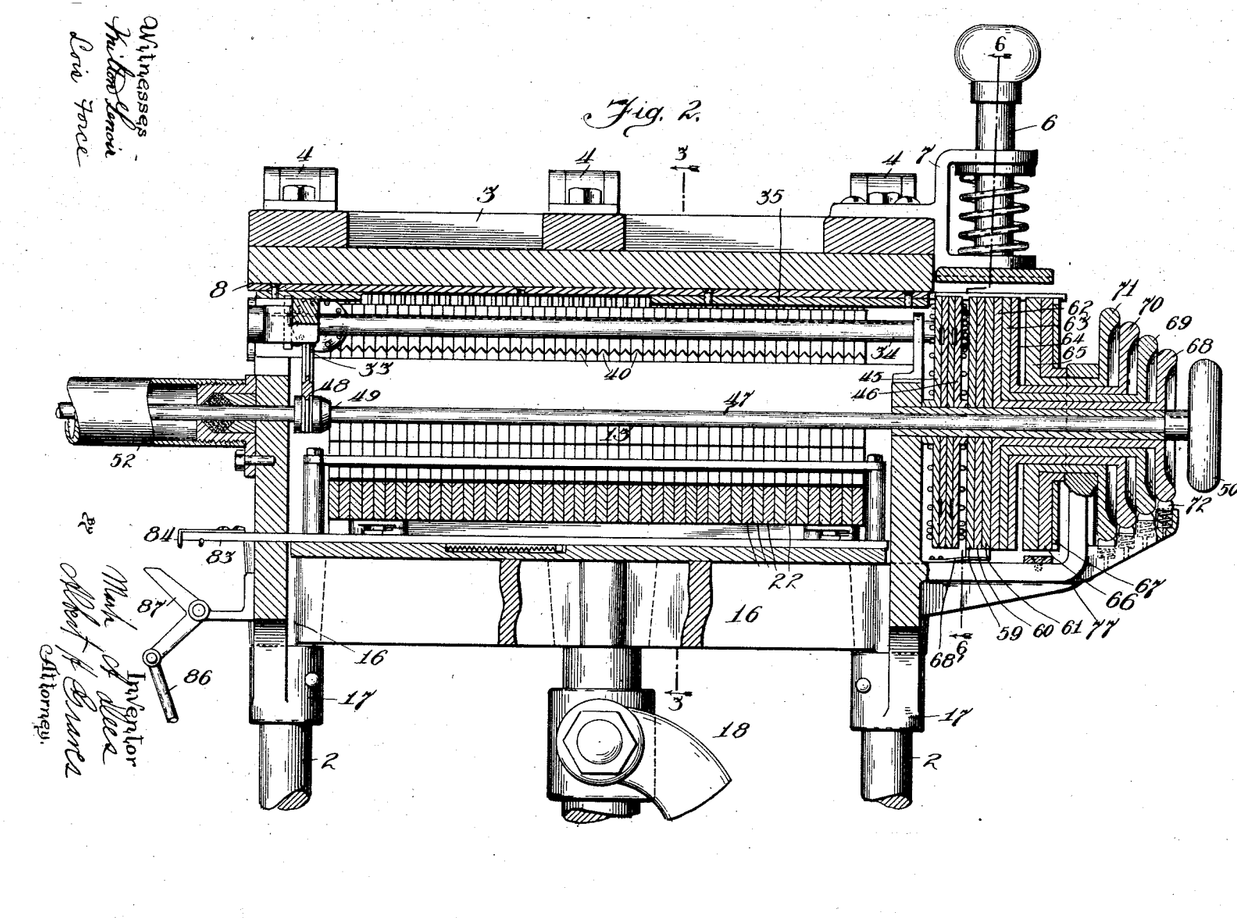
Fig. 2 is a central longitudinal section, some parts being in full lines and some parts being broken away to show more distant parts.
Figure 4:
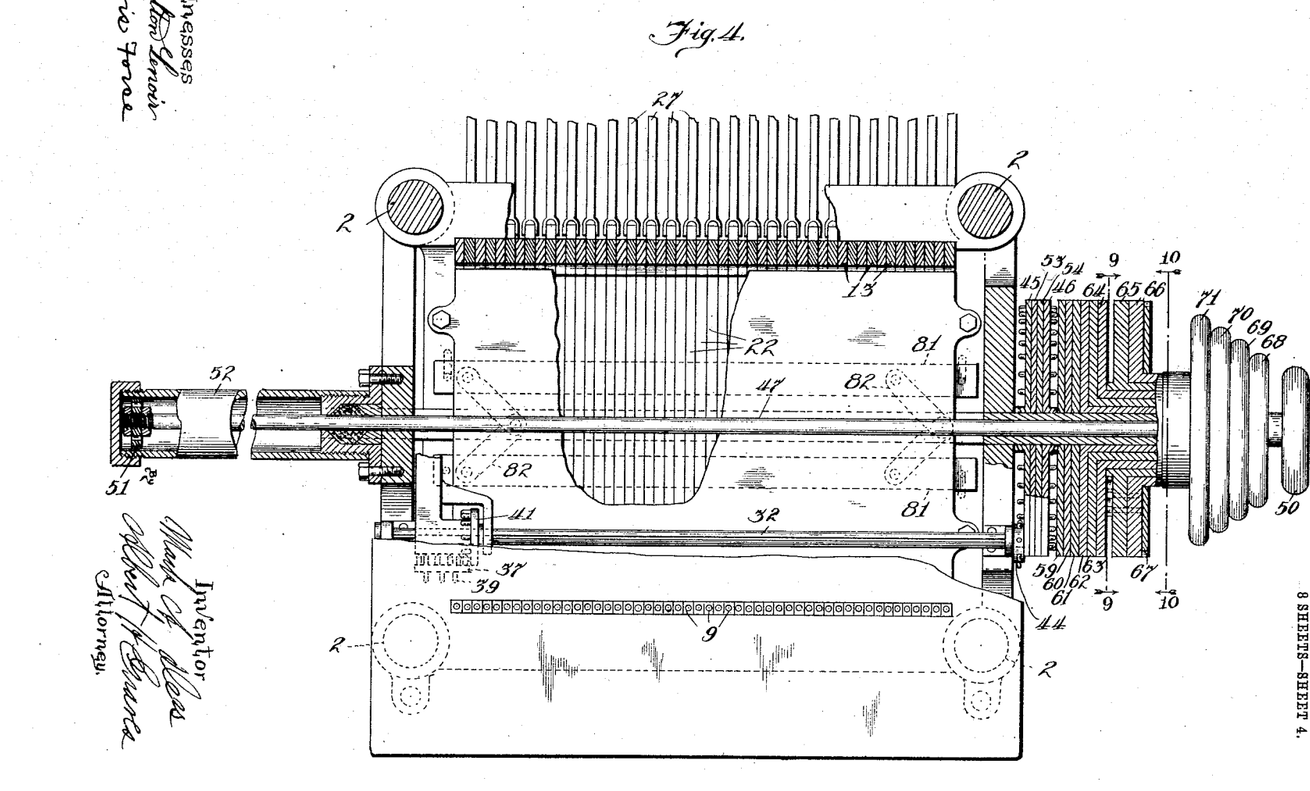
Fig. 4 is a horizontal section on the line of the central shaft, some parts on one side of the device being in plan and some of the other parts being broken away so as to show the lower parts on the other side.

Adjacent to the wheels just described, and on the same axes with them, as shown best in Figs. 2 and 4, are a series of other wheels 59, 60, 61, 62, 63, 64, 65, 66 and 67. The wheels 59, 60 and 61 are the wheels which represent the date in the lower part of Fig. 16, and may be adjusted in any convenient manner for those dates. A friction member 68' serves to hold them from displacement. The other wheels 62, 63 and 64 are adjusted by hand-wheels 68, 69 and 70. Friction members 72 under these hand-wheels serve to hold them from displacement. Another hand-wheel 71 serves to adjust the wheel 65 in the same manner.

The wheels 65 and 66 each contain one hundred numbers from 00 to 99, and are the ones which print the figures at the extreme lower part of sheet 16. The wheel 65 carries figures representing units and tens, and the wheel 66 carries figures representing hundreds and thousands. The wheel 65 is adjustable by the hand-wheel 71 step by step or as far as desired. When the wheel 65 has made a complete revolution a lug 73 on the wheel 65 strikes an arm 74 loosely mounted upon a short shaft 75 carried by an arm 76 on a bracket 77 fast to the front part of the table 1. The arm 74 carries a pawl 78 adapted to engage a ratchet wheel 79 to turn it an extent corresponding to the contact between 73 and 74. The wheel 79 is fast to a pin 80 which engages the ratchet wheel 67, which ratchet wheel is fast to the wheel 66 carrying the hundreds and thousands numbers. This apparatus is an ordinary 100 to 1 gearing, so arranged that when the wheel 65 has made a complete revolution the wheel 66 will make one forward step and present a new number at the printing point of the device, which is the point along the upper surface of the row of wheels here described and directly under the hand-stamp 6.

The movable members 22 are cut out underneath, and in that space is placed a pair of bars 81 connected together by toggle links 82, the center of which links are connected to another bar 83 which projects to the rear of the machine and has a downwardly projecting lip 84. A spring 85 (see Fig. 2) normally holds these bars and links in the position shown in full and dotted lines in Fig. 4. When a member 22 is moved from its central position, as shown in Fig. 3, the inner corners of the cut away portion are brought near to the bars 81 and are left in that position until the punches have been moved. When the operator, by means of the hand lever 21, raises the platen 16 he raises the members 22, the punches 12 and 13 and the bars 81. Connected to the shaft 20, through which this raising operation is carried on, is an arm 85 connected to a link 86, which link extends to the rear of the machine and connects to one arm of a bell-crank 87. The upward movement of the platen 16 results in the bell-crank 87 being turned on its pivot, so that the upper end of it comes under and behind the downwardly projecting lip 84. When the platen is lowered, and the shaft 20 turns on its pivot, the bell-crank 87 pushes the lip 84 outward until it clears said lip, the result of which movement is to move the rod 83 longitudinally in the machine, and this in turn spreads the bars 81 and makes them come in contact with the inner shoulder on the members 22. This spreading of the bars 81 results in returning the members 22 to mid-position, so that they are clear of the punches 12 and 13.

Figure 15:
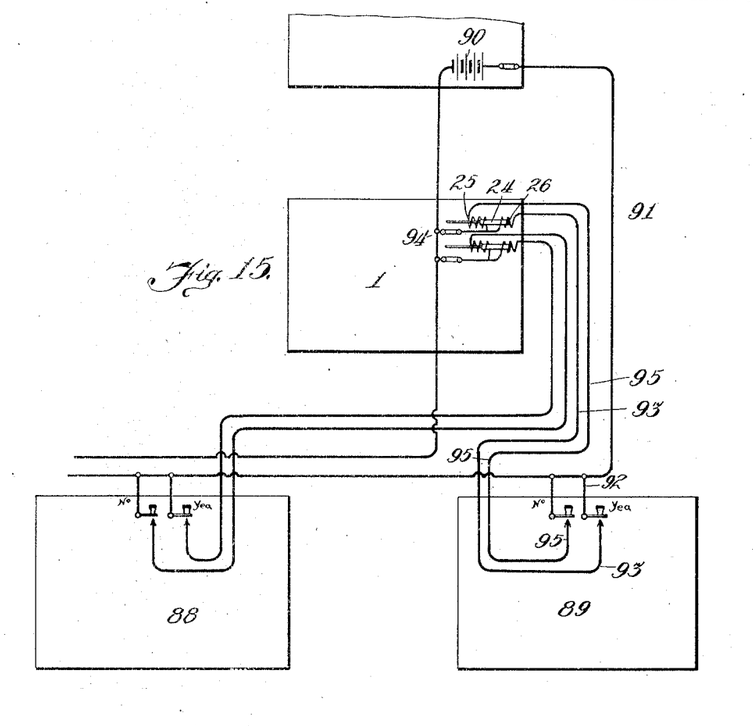
Fig. 15 is a diagram of the electrical circuits used in operating the devices for registering the votes.

In Fig. 15, at 88 and 89, are diagrammatically represented the desks of two legislators together with the yea and nay keys by which they operate their apparatus. Assuming that the legislator at desk 89 wishes to vote yea, he presses his yea key, when the current will flow from battery 90, conductors 91, 92, 93, one winding of his solenoid 24, conductor 94, to battery 90. This would move his member 22 under the yea punch which is allocated to him, so that when the platen 16 is raised this punch will make a punch mark in the record sheet of Fig. 16 in the yea column opposite his name. In case he wishes to vote nay, he would press the nay key, and the current then would flow from 90, 91, 95, the other winding of the solenoid 94, to battery 90. This would move his movable member 22 in the opposite direction under the nay punch, with the result that when the platen was raised the sheet would be punched with a nay vote at a position opposite his name.

The operation of the device is as follows: A measure being before the legislature to be voted upon, the speaker, or whoever is delegated for the purpose, will raise the cover 3 and lay upon the plate 8 a sheet like that of Fig. 16. He will then close the cover and secure it down by the buttons 5, said buttons being for the purpose of holding the cover against the punching process. The apparatus in general is supposed to be in the position shown in the drawings. A vote being called for, each legislator presses his yea key or nay key, according as he desires to vote, the result being that he moves his movable member 22 under either his yea punch or his nay punch, according to which key he depressed. The operation of moving the member 22, of course, being through the action of the solenoid, as just described. The voters having been notified to indicate their votes, the person operating the machine will move the lever 21 to raise whatever punches have been indicated or selected by the legislators in moving their members 22. The result is that these punches are moved upward and punch holes in the record sheet after the manner illustrated in Fig. 16. While the lever 21 is held down and the platen 16 is held up he pulls out on the handle 50, which moves the shaft 47 longitudinally and carries the frame 33 with it. This frame carrying the various wheels before mentioned and the pins 36 on the wheels 37 and 38 engage the projecting points 40 on all of the punches 12 or 13 that may happen to have been elevated by the raising of the platen 16. The engagement of the pins 36 on the wheel 37 with the points 40 on the yea punches 12 will move the shaft 32 a distance corresponding to one of the teeth or pins 36 on the wheel 37. The movement of the shaft 32 is conveyed through to the wheel 44, which wheel engages pins on the wheel 45. This wheel 45 has on its periphery numbers indicating yea votes, each time a pin 36 strikes a point or projection 40 the wheel 45 is moved one step and one yea vote is counted with the proper number presented in the top line of wheels representing the printing point under the hand-stamp 6. The total number of yea votes thus recorded by the wheel 45 will, of course, correspond to the number of projections 40 which the pins 36 strike, and these in turn will correspond to the number of punches 12 which have been selected by the voters. The wheel 45 will therefore present at the printing point a number corresponding to the yea votes. In a similar manner the pins on the wheel 38 will turn the wheel 46 to present at the printing point a record of the number of nay votes cast. Each time that a pin on the wheel 37 strikes a projection on a punch, the movement of the wheel 45 will cause its pawl 58 to engage one of the teeth 57 of the wheel 53 and turn both wheels 53 and 54 by a movement corresponding to the movement of the wheel 45. In a similar way a movement of the wheel 46 will correspondingly move the wheels 53 and 54. The yea and nay punches being opposite each other in pairs, and the wheels 37 and 38 also being opposite each other, the wheels 37 and 38 never operate simultaneously, because no voter votes both yea and nay at the same time. As a consequence the wheels 53 and 54 are advanced intermittently by wheels 45 or 46. These wheels 53 and 54 have their numbers arranged in such a way that the two adjacent numbers on the wheels added together equal the sum of all of those entitled to vote, thus in Fig. 16 the figure five is opposite the words "not voting", which is a number coming from the wheel 53. The number 45 opposite the words "total votes" similarly come from the wheel 54. The 45 and 5 added together equal 50, the total number of persons entitled to vote. If the wheels 53 and 54 be moved one step in either direction from a position which would print these numbers, one number is increased by one while the other is decreased by the same amount; the same also being the total persons entitled to vote. When the handle 50 is drawn out to the extreme distance, and the several wheels have presented at the printing point the numbers which indicate the yea and nay votes, the total votes and the number not voting, the operator strikes the hand-stamp 6 and prints these numbers upon the sheet which he has previously placed in position. When this is done he then pushes the handle 50 inward, the effect of which is to return the various wheels to their normal position by the pins 36 engaging the projecting points 40 on their return movement in the same way that they did on the movement previously described. Upon the return of this handle 50 and its connected parts to normal position, he releases the lever 21 and permits the platen 16 to drop down to its normal position. When the operator first moves the lever 21 he moves the link 86 so as to throw the bell-crank 87 under and behind lip 84. When he releases the lever 21, after completing the operations previously described, the movement of the platen 16 back to normal position, and the movement of the arm 85 and link 86 turns the bell-crank 87 on its pivot to throw the bar 87 rearwardly, the effect of which is to spread the parallel bars 81 and thus restore the movable members to their normal positions.

The operation of the device is apparent from the foregoing description. It may be noted however that as many copies of the tally sheet may be made as desired by simply inserting the number of blanks required in position before operating the punches. Preferably an "N" is also printed on the sheet opposite the part thereof to receive the negative punches.

While I have herein shown a preferred embodiment of my invention, it may be considerably varied in details of construction without departing from the spirit thereof.

I claim as my invention:

1. In a vote-recording device, a series of punches arranged in pairs, devices for operating said punches but normally disconnected therefrom, devices associated with each pair of punches and arranged so that when operated it will connect a selected one of said punches to the punch-operating devices, and electro-magnetic devices for independently operating the associated devices to select a desired punch.

2. In a vote-recording device, the combination with devices for holding a record sheet, and a series of punches arranged in pairs for recording yea and nay votes on such sheet, of mechanically actuated devices for operating previously selected punches so as to perforate such record sheet, and electrically-operated devices for selecting either punch of a pair of punches, each such electrically-operated device being controlled from a position allotted to each voter.

3. In a vote-recording device, the combination with devices for holding a record sheet, and punches arranged in pairs for recording yea and nay votes in such sheet, of electrical devices controlled by each voter by means of which he selects a desired one of a pair of punches allotted to him, mechanically and positively actuated means for operating the selected punches so as to mark the record sheet, and mechanism for counting and numerically recording the operated punches.

4. In a vote-recording device, the combination with devices for holding a record sheet, and punches arranged in pairs for recording yea and nay votes on such sheet, each pair of punches being allocated to a different voter, of devices under the control of each voter for selecting a desired one of the punches allocated to him, mechanically and positively actuated means for operating the selected punches so as to mark the sheet, devices for counting the punches so operated, and mechanism for numerically recording the number of punches of each kind selected by the voters.

5. In a vote-recording device, the combination with devices for holding a record sheet, and independently movable punches arranged in pairs for recording yea and nay votes on the sheet, each pair of such punches being allocated to a different voter, of means controlled by each voter for selecting a desired one of the recording punches allocated to him, independent means for operating the selected punches so as to mark the record sheet, mechanism for counting the punches selected by the voters, and other mechanism for numerically recording the number-marking punches of each kind selected by the voters.

6. In a vote recording device, the combination with a series of punches arranged in two rows, each punch in one row having a corresponding punch in the other row and two corresponding punches constituting a pair for recording either an affirmative or a negative vote, and devices for holding a record sheet so as to be perforated by said punches, of means by which each voter may select a desired one of a pair of punches allocated to his use, independent means for moving the selected punches to perforate the sheet, gears adapted to be moved along the rows of punches and to engage all moved punches but not to engage unmoved punches, means for so moving said gears, registering wheels operated by said gears when engaging moved punches, and means for impressing the paper with numbers indicated by the registering wheels.

7. In a vote recording device, the combination with devices for holding a record sheet, and numbered wheels for recording the number of yea and nay votes upon the sheet, of a series of movable punches representing yea votes and a second series of movable punches representing nay votes, electrically operated mechanisms by which a voter may select either a yea or a nay device, means by which the selected punches may be moved from normal position after being selected by the voters, gears adapted to engage and be operated by the moved punches, and connections from said gears to said wheels for operating the latter.

8. In a vote recording device, the combination with devices for holding a record sheet, punches for perforating the sheet to indicate yea and nay votes in detail, and numbered wheels for recording the sums of yea and nay votes on the sheet, of electrically operated devices by which each voter may select either a yea or a nay punch, means for moving the selected punches to perforate the sheet, mechanism for counting the punches moved, and connections from said mechanism to said wheels for operating the latter.

9. In a vote recording device, the combination with devices for holding a record sheet, individual punches for indicating on the sheet the yea and nay votes in detail, and aggregate punches for indicating on the sheet the totals of yea and nay votes, of electrically operated means by which each voter selects a yea or nay individual punch, means for moving the selected punches to mark the sheet, mechanisms for counting the selected punches so moved, and connections from said mechanism to the aggregate punches for operating the latter.

10. In a vote recording device, the combination with devices for holding a record sheet, individual devices for indicating yea and nay votes in detail, aggregate devices for indicating totals of yea and nay votes, and mechanism by which the individual and aggregate devices are automatically brought into proper indicating position, of adjustable devices for indicating the character of the matter to which the yea and nay votes apply, and means for marking upon the sheet all of the indications mentioned.

11. In a vote recording device, the combination with a series of movable members indicating yea votes, a corresponding series of movable members indicating nay votes, and a device for moving said members but normally not in a condition to move any of them, of a series of bars each associated with one yea member and one nay member, means by which a movement of a bar in one direction will connect its yea member to the device for moving it while moving the bar in the other direction will connect the nay member to the device and electrical devices associated with each bar for moving it in either direction, the electrical devices for controlling each bar being allocated to a different voter.

12. In a vote recorder, the combination with a series of movable members each allocated to a different voter, and electrical devices for moving the members in either of two directions, a punch representing a yea vote adjacent to one end of each member and another punch representing a nay vote adjacent to the other end of each member, said members when in mid-position being free from both punches, of connections by which each voter may operate his electrical devices so as to move his movable member into connection with either a yea punch or a nay punch, an impressing device for operating the punches thus connected to the movable members, and automatically operating means for restoring moved members to mid-position after operation of the impressing device.

13. In a vote recorder, the combination with yea and nay markers, and a device for moving said markers but not normally in operative connection therewith, of a series of members each movable to connection with either a yea or a nay marker and each allocated to a different voter, electrical connections controlled by each voter for moving his member to connection with a selected marker so as to connect it to the device for moving it, connections for operating the marker moving devices, and automatically operating means for returning the movable members to normal position after the operation of the marker moving device.

14. In a vote recorder, the combination with punches representing yea and nay votes, shiftable bars controlling said punches and individual to each voter, and electrically operated mechanism for actuating said bars whereby each voter may select the desired kind of punch.

15. In a vote recorder, a series of punches arranged in pairs, shiftable bars individual to each pair of punches but normally in inoperative position, electrically controlled mechanism for independently operating the shiftable members to select a desired punch, and means for moving said shiftable members into operative engagement with said selected punches.

16. In a vote recorder, the combination with devices for holding a record sheet, of a series of punches arranged in pairs for recording yea and nay votes on such sheet, devices for operating said punches but normally in inoperative relation thereto, electro magnetic means for moving said operating devices into operative relation with the selected ones of said punches, and means for positively actuating said operating devices.

17. In a vote recorder, the combination with means by which each voter indicates the character of his vote, and devices for counting the votes of each kind, of two numbered wheels adjustably secured together so that the sum of the numbers adjacent to each other on the two wheels is always equal to the number of persons entitled to vote, other numbered wheels adjacent to the previously mentioned wheels, connections from the counting devices to the last mentioned wheel to rotate them so as to cause them to indicate the total votes of each kind, other connections from the last mentioned wheels to the wheels secured together so as to rotate them and cause them to indicate the total persons voting and number not voting, and means for printing said indications upon a sheet of paper.

18. In a vote recorder, the combination with means for indicating the character of the votes cast and devices for counting such votes, of two numbered wheels adjustably secured together to indicate the total votes cast and the number of persons not voting, and means for operating said wheels from the counting devices.

19. In a vote recorder, the combination with means for indicating the character of votes cast, and devices for separately counting each kind of votes, of two numbered wheels adjustably secured together to indicate the number of persons voting and not voting, and means for operating said wheels from the counting devices.

20. In a vote recorder, the combination with means for indicating the character of votes cast, and devices for counting each kind of vote separately, of two numbered wheels, devices by which they may be secured together in any one of a number of different positions to show the number of persons voting and the number not voting, means for operating said wheels from the counting devices, and means for printing the indication of said wheels upon a sheet of paper.

21. In a vote recorder, the combination with means for indicating the character of votes cast, devices for counting each kind of vote separately, and independently movable wheels for indicating the result of the count, of two other wheels adjustably secured together to indicate the number of persons voting and not voting, means for operating the last named wheels from the counting devices, and means for printing the indications of all of said wheels upon a sheet of paper.

22. In a vote recorder, the combination with means for indicating the character of the votes cast, devices for counting the votes, and automatically operating mechanism for indicating the results of the count, of manually adjustable wheels for indicating the subject matter to which the vote relates, and a stamp for printing all of said indications upon a sheet of paper.

23. In a vote recorder, a series of wheels mounted upon a common axis and bearing marks for indicating dates and subject matter upon which a vote is to be taken, means by which said wheels may be manually adjusted to any desired position so as to present at a printing point any desired indications, other wheels mounted upon the same axis and bearing numbers for indicating votes cast, means by which voters indicate within the recorder the character of their votes, devices controlled by such indicators for operating the last named wheels so that they will present at the printing point numbers indicating the character and number of votes cast, and devices for printing the several indications upon a sheet of paper.

24. In a vote recorder, the combination with devices for indicating and counting votes, of two numbered wheels adjustably secured together, independently movable wheels adjacent to the opposite sides of the wheels secured together, means for operating the independently movable wheels from the counting devices, and ratchet and pawl connections between the independently movable wheels and the wheels secured together for operating the latter.

25. In a vote recorder, the combination with a plurality of wheels for indicating the number and character of votes cast, and automatic means for operating said wheels so that the proper indications will be presented at a printing point, of a series of other wheels for indicating various matter relating to the votes cast, devices by which the other wheels may be manually adjusted so as to present desired indications at the printing point, friction devices for holding the manually moved wheels at the position at which they are set, and devices for printing the various indications on a sheet of paper.

26. In a vote recorder, the combination with a series of markers representing yea votes, a corresponding series of other markers representing nay votes, and a series of members movable to connection with either a yea or a nay marker, of a solenoid connected to each member for moving it in either direction, electrical connections from each solenoid to keys at a desk for operating the solenoid in a desired direction, and an impressing device for moving the selected markers.

27. In a vote recording device, the combination with devices for holding a record sheet, of a series of punches arranged in pairs for recording yea and nay votes on such sheet, shiftable members individual to each pair of punches, and normally in inoperative relation thereto, electro magnetic means for moving each of said shiftable members into operative relation with one member of its associated pair of punches, and means for positively and simultaneously actuating all of said shiftable members.

28. In a vote recorder, the combination with means for indicating the character of the votes cast, of devices for counting the votes, automatically operative mechanism for indicating the results of the count, adjustable wheels for indicating the subject matter to which the vote relates, and means for recording all of said indications upon a record sheet.

29. In a vote recording device, the combination with means for holding a record sheet, of a series of punches arranged in pairs, devices for operating said punches but normally disconnected therefrom, a device associated with each pair of punches and arranged so that when operated it will connect and select one of said punches to the punch operating device, electro magnetic devices for independently operating the associated device to select a desired punch, and mechanism for counting and numerically recording the operated punches.

30. In a vote recording device, the combination with devices for holding a record sheet, of a series of punches arranged in pairs, mechanism for positively operating said punches, intermediate devices for placing the selected ones of said punches in operative relation with the punch operating mechanism, and electro magnetic device controlling said intermediate mechanism.

31. In a vote recording device, the combination with devices for holding a record sheet, of a series of punches arranged in pairs for recording yea and nay votes on such sheet, means for positively actuating said punches, an intermediate device associated with each pair of punches and adapted to place selected ones of said punches in operative relation with the punch actuating mechanism.

MARK ASHLEY DEES.

Witnesses:
  E. S. KNIGHT,
  E. B. LINN.